Figure 1:
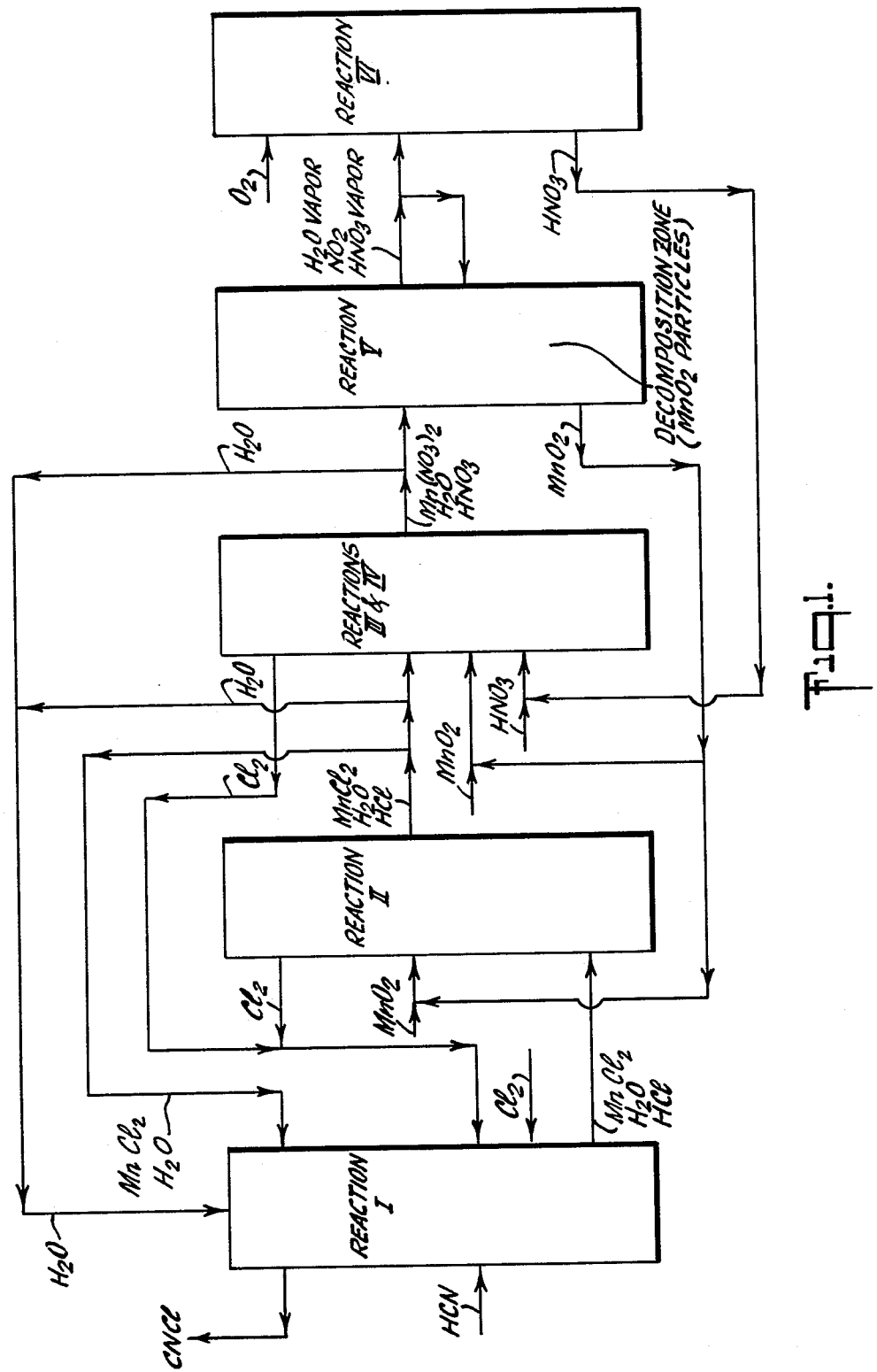

United States Patent [19]

Miller

[11] 4,100,263
[45] Jul. 11, 1978

[54] PROCESS FOR PREPARING CYANOGEN CHLORIDE AND GASEOUS CHLORINE

[75] Inventor: Ralph Miller, Pleasantville, N.Y.

[73] Assignee: Ciba-Geigy Corporation, Ardsley, N.Y.

[21] Appl. No.: 748,596

[22] Filed: Dec. 8, 1976

[51] Int. Cl.² .......................................... C01B 21/18
[52] U.S. Cl. .................................. 423/383; 423/507; 423/605
[58] Field of Search ............... 423/379, 383, 371, 364, 423/384, 605

[56] References Cited

U.S. PATENT DOCUMENTS

| | | | |
|---|---|---|---|
| 2,691,569 | 10/1954 | Miller | 423/398 |
| 3,567,406 | 3/1971 | Evers | 423/379 |
| 3,755,542 | 8/1973 | Suryanarayana | 423/364 |
| 3,825,658 | 7/1974 | Eckert et al. | 423/379 |

*Primary Examiner*—Earl C. Thomas
*Assistant Examiner*—Thomas W. Roy
*Attorney, Agent, or Firm*—Harry Falber

[57] ABSTRACT

This invention relates to an improved process for preparing cyanogen chloride by reacting chlorine and hydrogen cyanide in a manganous chloride-containing aqueous medium to form gaseous cyanogen chloride and dissolved hydrogen chloride and to the subsequent conversion of the hydrogen chloride to chlorine employing manganese dioxide and nitric acid as cyclic reagents.

5 Claims, 1 Drawing Figure

PROCESS FOR PREPARING CYANOGEN CHLORIDE AND GASEOUS CHLORINE

Substantially all of the millions of pounds of cyanogen chloride made annually is produced by reacting chlorine and hydrogen cyanide in the presence of water to form gaseous cyanogen chloride and a dilute hydrochloric acid solution. A process for making cyanogen chloride now employed on a large commercial scale is described in U.S. Pat. No. 3,567,406. The process described in this patent has for a principal object the production of cyanogen chloride in high yield with the concomitant production of a relatively concentrated solution of hydrochloric acid. Diligent development of this process has shown that excellent cyanogen chloride yields are obtained when the concentration of the hydrochloric acid which is formed is below about 15%. Higher acid concentrations can be obtained but at the expense of somewhat diminished yields. The key criteria to be met in such cyanogen chloride processes are keeping hydrolysis losses low, substantially eliminating direct loss of cyanogen chloride and, due to its instability, preventing the formation of $NCl_3$.

A further major aspect of this technology is the desirability to obtain economic value from the relatively dilute acid resulting from this commercial process. Difficulties in achieving this goal stem from the absence of a substantial market for pure hydrochloric acid below the commercial strength of 20° Bé or 31.45%. Moreover, the acid resulting from the aqueous generation of CNCl is not pure since it is generally contaminated with trace amounts of ammonium chloride. As a result of this combination of circumstances, under present conditions, the relatively dilute impure acid has no economic value. In fact, before discarding the effluent acid from the process, it has to be neutralized. Inasmuch as the cost of neutralizing the effluent acid does not change with its concentration, there is little incentive to operate the commerical CNCl process in any fashion other than to obtain the maximum possible CNCl yield. The primary handicap encountered in the innumerable attempts which have been made to obtain some value from this acid relates to the fact that about 6 pounds of water are associated with each pound of hydrogen chloride. It is, accordingly, prohibitively expensive to separate the water from the HCl because water and HCl form an azeotrope containing only 20% HCl.

It has been proposed in the past to convert hydrogen chloride to chlorine using manganese dioxide and nitric acid as cyclic reagents. Such a method requires that the manganous nitrate contained in the residual reaction mixture be economically converted to manganese dioxide and nitric acid. The previously described methods of carrying out this conversion have included as one step the thermal decomposition of the manganous nitrate under such conditions that the overall conversion cost has proved to be excessively expensive. For example, it has been found that various disadvantages are encountered when employing the methods described in U.S. Pat. No. 2,691,569. Thus, should this method permit the manganous nitrate-containing solution to actually touch the heat transfer surface, the result will be the formation on the wetted surface of a strongly adherent, insulating scale of manganese dioxide. This diminishes the heat transfer to the point where the operation either halts or becomes uneconomic. The poor economics of such a scheme is only partially alleviated by the use of knife-blade scrapers and the like. This kind of scheme is exemplified by the use of an internally heated unit similar to a drum dryer equipped with a closely fitted knife blade to scrape off the adherent manganese dioxide. The decomposition can be accomplished but the method is excessively high in initial investment, maintenance and labor.

Another method proposed in the past employed a fluidized bed of manganese dioxide in which heating coils or heating surfaces were immersed. An appreciable depth of bed was maintained above the upper heat transfer surface. Air was passed through the bed to keep it in a fluidized state. The manganous nitrate-containing solution was sprayed on to the top surface of the bed or within the bed at such a controlled rate that the decomposition took place on the particles composing the bed. None of the liquid was allowed to contact the heat transfer surface. The gas leaving the decomposition zone was composed of water vapor, nitric acid, some nitrogen dioxide and the large amount of air needed to keep the bed in an optimum condition of fluidization. Although this method prevents the fouling of the heat transfer surface, the presence of the fluidization air dilutes the gaseous decomposition products thereby complicating and increasing the expenses of the complete recovery of the oxides of nitrogen. Moreover, because the nitrogen dioxide is diluted with air it becomes excessively costly to recover it as concentrated nitric acid, i.e., acid whose concentration is close to that of the nitric acid-water azeotrope.

It is, therefore, a primary object of this invention to provide a cyanogen chloride process in which chloride and hydrogen cyanide react in an aqueous medium to form cyanogen chloride and by-product hydrogen chloride which meets the above criteria for a successful process and makes possible the economical conversion of the by-product hydrogen chloride to chlorine.

A further object is to economically convert the by-product hydrogen chloride to chlorine by employing nitric acid and manganese dioxide as cyclic reagents.

An additional object is to minimize the water evaporation burden of this improved cyanogen chloride process by reacting the chlorine and hydrogen cyanide in a manganous chloride-containing aqueous medium.

A further object is to provide techniques for the formation of manganese dioxide and nitrogen dioxide from the manganous nitrate formed during the conversion of the hydrogen chloride to chlorine in such a manner that the nitrogen dioxide can be economically converted to concentrated nitric acid.

Various other objects and advantages of this invention will be apparent from the following description thereof.

It has now been determined that by conducting a cyanogen chloride process comprising the reaction of hydrogen cyanide and chlorine in the presence of an aqueous manganous chloride-containing medium, conditions will be appropriate for readily and economically converting the dissolved hydrogen chloride by-product into chlorine. An important economical feature is the minimization of water removal costs. This procedure also retains the necessary conditions for successful cyanogen chloride production, namely, minimal hydrolysis losses, substantially no direct loss of cyanogen chloride product and substantially no formation of unstable nitrogen trichloride.

The conversion of the dissolved hydrogen chloride is thereafter conducted by a sequence of chemical reactions utilizing manganese dioxide and nitric acid as cyclic reagents while employing air or oxygen as the basic oxidant. As a part of this process, improved methods are employed for the thermal decomposition of manganous nitrate to form manganese dioxide and nitrogen dioxide. These improved methods are distinguished by making it possible to readily convert the nitrogen dioxide to utilizable nitric acid while simultaneously forming the bulk of the manganese dioxide on the surface of previously formed particles of manganese dioxide. These improved methods rely on recycling a part of the exiting gas stream comprising water, nitric acid and $NO_2$ to the decomposition reactor as the fluidization medium when the decomposition reactor is a fluidized bed or as a heat transfer medium when the reactor is a rotary kiln. In each instance, the solution containing the manganous nitrate to be decomposed is spread over the surface of particles of previously formed manganese dioxide prior to the actual occurrence of the decomposition.

The process of this invention thus proceeds according to the following reaction sequence.

I)

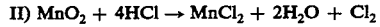

II) $MnO_2 + 4HCl \rightarrow MnCl_2 + 2H_2O + Cl_2$

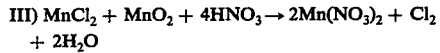

III) $MnCl_2 + MnO_2 + 4HNO_3 \rightarrow 2Mn(NO_3)_2 + Cl_2 + 2H_2O$

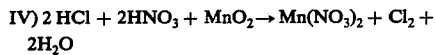

IV) $2HCl + 2HNO_3 + MnO_2 \rightarrow Mn(NO_3)_2 + Cl_2 + 2H_2O$

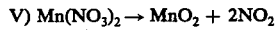

V) $Mn(NO_3)_2 \rightarrow MnO_2 + 2NO_2$

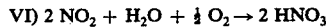

VI) $2NO_2 + H_2O + \frac{1}{2}O_2 \rightarrow 2HNO_3$

This sequence and the various recycle streams are diagrammatically depicted in FIG. 1 which represents a flow sheet of the total process.

Various apparatus for conducting reaction I are noted in U.S. Pat. Nos. 3,197,273 and 3,567,406. A preferred method for purposes of this invention involves a modification of the column reactor and stripping column described in U.S. Pat. No. 3,567,406. The described column reactor from top to bottom consists of a scrubbing zone, two independently cooled reaction zones one above the other but separated by an HCN feed inlet zone and, below the bottom reaction zone, a lower chamber equipped with gas dispersing means such as packing. The lower chamber is connected to a stripping zone or column.

The suggested modification is the division of the upper scrubbing section of the column into two scrubbing zones with a feed section between the upper and lower scrubbing zones. In this preferred embodiment, cold water enters the reactor close to its top and above the upper scrubbing zone. A cold manganous chloride solution is fed to the feed section between the two scrubbing zones, HCN enters the column at an HCN feed inlet zone between the two reaction zones and chlorine enters the stripping column close to the bottom of the stripping column.

Chlorine and HCN are fed to the cyanogen chloride reactor in at least stoichiometric proportions and ranging up to about 1.10 moles of $Cl_2$ per mole of HCN feed. The concentration of manganous chloride in the aqueous manganous chloride reaction medium can be widely varied and will generally range from about 15 to 30%, by weight. It is desirable to utilize as concentrated a solution as possible in order to avoid excessive subsequent evaporation without disrupting the basic requirements of the reaction, as indicated primarily by increased hydrolysis losses. The temperature at the bottom and middle of the reaction section will generally range from about 25° to 40° C., while the temperature at the top of the reactor will generally range from about 15° to 25° C. Temperature control of the rection will primarily be provided by the available heat transfer area and the temperature and volume of the cooling fluid passed through the independently cooled reaction zones. The cyanogen chloride gas continuously leaves from the top outlet of the column reactor. The liquid effluent from the CNCl reactor consisting of an aqueous solution of $MnCl_2$ and HCl leaves from the bottom outlet of the column reactor. The solution is thereafter refluxed with an excess of solid $MnO_2$, i.e., an amount which is from 10% to 300% or more in excess of the stoichiometric amount based on the HCl in the column effluent. Most of the HCl reacts with $MnO_2$ to form chlorine, $MnCl_2$ and water as shown in reaction II.

The gaseous chlorine which is formed is preferably recycled to the CNCl reactor at about the same location at which the fresh feed chlorine is introduced into the reaction. If necessary, or desirable, the chlorine can be recovered as liquid chlorine using standard procedures. Since chlorine is formed and recovered from the effluent leaving the CNCl reactor it is not essential to heat the solution as it flows through the lower end of the stripping column.

The resulting $MnCl_2$ solution which is still slightly acid is divided into two portions. One portion contains as much $MnCl_2$ as was contained in the effluent liquid flowing from the CNCl reactor into the reaction zone for reaction II. This portion is cooled and recycled to the CNCl reactor. The other portion is evaporated so that the concentrated solution contains about 50% manganous chloride. This concentrated manganous chloride solution is thereafter reacted pursuant to reaction III at the boiling point of the system with an excess of manganese dioxide and an excess of concentrated nitric acid to form chlorine and an acidic manganous nitrate solution in which the excess manganese dioxide is suspended. The feed nitric acid concentration should be close to the azeotropic composition and preferably not below 50%. The reaction will go as written even though less concentrated nitric acid is employed. The use of an excess of concentrated nitric acid as the reaction medium has an unobvious beneficial effect on the overall economics of the process. Thus, the reaction is conducted at the boiling point and the reaction mixture is composed of a concentrated manganous chloride solution, nitric acid and particles of finely divided solid manganese dioxide. To ensure that the reaction will proceed smoothly, enough liquid must be present to keep the solid particles suspended and the manganous nitrate dissolved. These conditions could be met by having enough water present to form a 15% to 30% aqueous solution of the manganous nitrate and a modest excess of nitric acid. The solution would, at the end of the reaction, consist of essentially a slightly acidic solution of manganous nitrate. Since the next reaction in the process is the thermal conversion of $Mn(NO_3)_2$ to $NO_2$ and $MnO_2$, all of the liquid associated with the Mn(NO$_3$)$_2$ must be vaporized prior to the Mn(NO$_3$)$_2$ reaching its decomposition temperature. For every pound of water that has to be vaporized, almost 1000 Btu will have to be supplied. Under similar circumstances the same amount of heat will vaporize about 4 pounds of nitric acid. However, by employing concentrated nitric acid, i.e., acid whose concentration is in the 50% to 67% range, as the reaction medium instead of water, the reaction proceeds more quickly and to a slightly greater degree of completion, and, simultaneously, the evaporation burden of the succeeding step in the process is diminished.

Representative ratios of the reactants include from 100% to 300% of the MnO$_2$ required to react with the MnCl$_2$ in accordance with reaction III and from 50% to 300% of the nitric acid required to react with the MnCl$_2$ in the same reaction. The small amount of HCl contained in the manganous chloride solution is also converted to chlorine, water and manganous nitrate pursuant to reaction IV.

The chlorine formed in reactions III and IV are preferably fed to the CNCl reactor, although, if necessary or desirable, the chlorine can be recovered as liquid chlorine using well known procedures.

Simultaneously with the formation and evolution of the chlorine, some of the water in the above reaction mixture is distilled off. Generally, from 1 to 2 pounds of water are distilled off for each pound of chlorine produced. The purpose of this water removal is to prevent a water build-up in the system. It also increases the nitric acid concentration, thereby driving the chlorine formation reaction in the desired direction.

The manganous nitrate contained in the residual reaction mixture is then converted to manganese dioxide and nitric acid in two additional interrelated steps. The first step is the thermal decomposition of manganous nitrate, as shown in reaction V, under such conditions that the nitrogen dioxide formed in the reaction is readily converted to concentrated nitric acid pursuant to reaction VI.

Two improved methods of carrying out the thermal decomposition of manganous nitrate can be employed, each of which meets the aforesaid condition. As indicated previously, one method employs a fluidized bed reactor and the other a rotary kiln. The fluidized bed reactor is composed of a fluidized bed of solid manganese dioxide particles in which an extended area of heat transfer surface is immersed. When the bed is in an expanded condition, a substantial depth of bed ranging from about 30% to 60% of the total bed depth is maintained above the top of the heat transfer surface. A heat transfer fluid such as hot oil, molten salt or high-temperature vapor is circulated through the inner passages of the heat transfer surface. The heat transfer agent entering the heating equipment is preferably at a temperature in excess of 350° C. so that the required area of expensive heat transfer surface is minimized. The feed to the manganous nitrate decomposition reactor is sprayed on the top surface of the fluidized bed or into the bed at a location sufficiently distant from any heat transfer surface so that none of the liquid can reach any of the heat transfer surface. The solution is fed to the fluidized bed at such a rate that the particles within the bed are maintained at a temperature not less than about 180° C. When the solution contacts the bed, the water and nitric acid are vaporized and the Mn(NO$_3$)$_2$ decomposes to solid MnO$_2$ and gaseous NO$_2$. The MnO$_2$ tends to adhere to the particles forming the bed and causes them to increase in size. In order to maintain good fluidization, means are provided to take particles out of the bed and classify them. Thus, the larger particles are recycled to the zones in which reactions II and III are conducted, while the smaller particles are returned to the bed. If necessary, some of the particles taken out of the bed may be milled and the ground particles returned to the bed.

The vapor leaving the bed consisting of water, nitric acid and NO$_2$ flows to the inlet of a blower. The pressure increase obtained by the action of the blower is used to recycle a part of the gas stream back through gas dispersion means located at the bottom of the fluid bed, through the bed and then back to the blower. The flow of gas through the dispersed bed is kept at the optimum velocity to maintain the bed in a stable fluidized condition. This scheme provides constant fluidizing conditions as long as a pre-determined maximum manganous nitrate feed rate to the bed is not exceeded. The composition and rate of the feed can vary within large limits without causing operational difficulties providing that the feed rate is below the allowable maximum. When the temperature of the heat transfer medium is about 350° C., about 5400 Btu per hour is transferred to the bed per square foot of immersed heat transfer area. Another attribute of this method is that changes in the feed rate will not affect the recovery and conversion of the NO$_2$ to nitric acid. This advantage is gained because, unlike prior methods of fluidizing the bed, the gas used to fluidize the bed is free from non-condensible, non-reactive gases such as nitrogen.

The preferred method of carrying out the thermal decomposition reaction employs a rotary kiln fitted with appropriate seals at the inlet and discharge ends. By means of a blower, pressure controls, and dampers, the kiln is maintained under a very slight vacuum. In this way, air leakage into the system is negligible.

A circulating stream of solid manganese dioxide particles is established. The hot particles leaving the outlet end of the kiln are conveyed by means of a screw conveyor or equivalent to a liquidsolids mixer which also functions as the feed hopper of the kiln. The feed to the system is the solution of manganous nitrate dissolved in concentrated nitric acid. The feed is introduced into the solids-liquid mixer by means of inlet nozzles. The discharge from the mixer is a bed of wet particles. These wet particles, which contain about 10% to 25%, by weight, of liquid phase, are then fed to the kiln.

A circulating stream of nitric acid vapor, water vapor and NO$_2$ is established which passes out of the discharge end of the kiln, to the inlet side of a blower, out the blower through a heat exchanger and into the inlet end of the kiln. The gas entering the heat exchanger is kept within a temperature range of about 210° C to 250° C. The outlet temperature of the gas is usually maintained in the temperature range of 400° C to 500° C. The gas is preferably heated in a gas to gas heat exchanger using products of combustion as the heating medium.

As the operation proceeds the amount of manganese dioxide in the circulating stream builds up. Solid manganese dioxide is withdrawn from the circulating stream periodically or continuously. The amount withdrawn is equivalent to the amount of manganese dioxide formed from the manganous nitrate fed to the decomposition operation. To prevent the loss of NO$_2$ and nitric acid, enough vapor is withdrawn from the circulating vapor stream so that the gaseous pressure within the system is maintained, as related above, just below atmospheric pressure.

In either instance, the portion of gas leaving the decomposition reactor which is not recycled is cooled to a temperature of about 35° to 40° C, by means of available cooling water. The resulting mixture of liquid nitric acid plus gaseous $NO_2$ can be processed in several ways. One procedure is to feed the mixture of gas and liquid to a liquid ring compressor such as the well known Nash Compressor. The mixture is compressed to a pressure which is varied depending upon the temperature of the available cooling water. The boiling point of $NO_2$ at atmospheric pressure is 21° C. The mixture is compressed so that on cooling, using available cooling water, the $NO_2$ is condensed to the liquid state. In this way substantially all of the gaseous mixture leaving the decomposition zone, except that portion which is recycled to the decomposition zone, is condensed to a liquid, The liquid, composed of a mixture of aqueous nitric acid and liquid $NO_2$, is thereafter pumped into a reaction zone at superatmospheric pressure along with substantially pure oxygen. Cooling means and gas-liquid contacting means are provided within the reaction zone. Under these conditions, the $NO_2$ is converted to nitric acid by means of reaction VI. This known technique of converting the $NO_2$ to nitric acid is feasible because the $NO_2$ is able to be pumped into the reaction zone in the absence of any non-reactive, non-condensible gas such as nitrogen.

Similarly, the known process of converting $NO_2$, as liquid or gas, to concentrated nitric acid using air under superatmospheric pressure can also be applied.

When the water content of the feed to the decomposition zone is relatively high and the above processes are employed, the concentration of the recovered nitric acid will be lower than is desirable. The excess water can be eliminated by cooling the portion of the gas leaving the decomposition zone which is not recycled, separating the resulting gas and liquid, fractionally distilling the liquid to separate water overhead and recovering more concentrated acid as the bottom product, mixing the bottom product and the $NO_2$ and then converting $NO_2$ to nitric acid by either of the above noted procedures. In this manner, the recovered concentrated nitric acid is suitable for recycle and use in reactions III and IV.

The process is thus seen to provide an improved cyanogen chloride process whereby the hydrochloric acid by-product is formed under such conditions that it can be readily and economically converted to chlorine. Furthermore, as compared with previously known procedures, substantially improved methods have been devised for converting manganous nitrate and water to solid manganese dioxide and concentrated nitric acid.

The following examples will further illustrate the embodiments of this invention. In these examples, all parts given are by weight unless otherwise noted.

EXAMPLE I

This example illustrates the procedure for preparing cyanogen chloride in an aqueous manganous chloride-containing medium. It also illustrates the advantages of this procedure as contrasted with the conventional aqueous reaction.

A 1 inch diameter column packed with ¼ inch Intalox saddles and having a top scrubbing zone 14 inches long, an upper reaction zone (provided with a cooling water jacket) 12 inches long, an HCN inlet zone 8 inches long, a lower reaction zone, (also provided with a cooling water jacket) 12 inches long and a bottom stripping zone of a total length of 80 inches was utilized as the column reactor. The total column length between the chlorine inlet level and the bottom of the lower reaction zone was 80 inches. The bottom 14 inches of the reactor was wrapped with heating tape so that the liquid effluent was substantially at its boiling point.

A number of experiments were conducted. Table I illustrates the feed and product data for the reaction conducted in a water medium, while Table II illustrates the feed and product data for the reaction conducted in a 19%, by weight, aqueous manganous chloride solution.

TABLE I

| Feed (gm/min.) | | | Overhead Gases (%) | | | Reaction Zone Temp. (° C) | Effluent Liquid % HCl | % Hydrolysis | % $NCl_3$ |
|---|---|---|---|---|---|---|---|---|---|
| HCN | $Cl_2$ | Water | HCN | $Cl_2$ | CNCl | | | | |
| 1.0 | 3.12 | 13 | Tr | 10.1 | 89.9 | 29 | 10.8 | 2.8 | 0.12 |
| 1.0 | 3.05 | 13 | Tr | 8.6 | 91.4 | 26 | 9.6 | 0.03 | Tr |
| 1.0 | 3.20 | 19.5 | ND | 10.7 | 89.3 | 28 | 7.7 | — | 0.15 |
| 1.0 | 3.0 | 19 | ND | 10.1 | 89.9 | 28 | 6.7 | 0.04 | ND |
| 1.0 | 3.12 | 38.5 | Tr | 7.1 | 92.9 | 26 | 3.4 | 1.5 | 0.33 |
| 1.0 | 3.03 | 38.5 | ND | 8.4 | 91.6 | 24 | 3.7 | 1.9 | ND |

Tr - Trace
ND - Not Detected

TABLE II

| Feed (gm/Min.) | | | Overhead Gases (%) | | | Reaction Zone Temp. (° C) | Effluent Liquid % HCl | % Hydrolysis | % $NCl_3$ |
|---|---|---|---|---|---|---|---|---|---|
| HCN | $Cl_2$ | $MnCl_2$ | HCN | $Cl_2$ | CNCl | | | | |
| 1.05 | 2.85 | 18 | 1.7 | 9.1 | 89.2 | 25 | 7.1 | 0.7 | — |
| 0.83 | 2.85 | 18 | ND | 22.6 | 77.4 | 25 | 7.1 | 0.4 | — |
| 1.0 | 2.65 | 11 | 3.3 | 9.0 | 87.7 | 25 | 10.1 | 0.8 | ND |
| 1.0 | 2.65 | 37 | Tr | 7.9 | 92.1 | 25 | 3.9 | 2.0 | ND |
| 1.0 | 2.55 | 37 | Tr | 10.1 | 89.9 | 25 | 3.5 | 1.5 | ND |
| 1.0 | 2.45 | 37 | ND | 8.7 | 91.3 | 25 | 3.5 | 1.5 | ND |
| 1.0 | 2.70 | 11 | 1.5 | 10.3 | 88.2 | 25 | 9.7 | 0.5 | ND |
| 0.95 | 2.35 | 18 | Tr | 9.3 | 90.7 | 23 | 6.7 | 0.8 | ND |
| 1.0 | 2.0 | 37 | ND | 8.4 | 91.6 | 22 | 3.0 | 1.7 | ND |

Tr - Trace
ND - Not Detected

A review of the data reveals that the reaction in the aqueous $MnCl_2$ medium shows an unexpected advantage in preventing $NCl_3$ formation, while retaining the generally high yield of cyanogen chloride product.

The column was then modified by extending its top with a 6 inches long section also packed with ¼ Intalox saddles. The extension enabled the upper portion of the column to have inlets for two liquid feeds, one entering the column at the very top and the second entering the column 6 inches below the top and directly underneath the bottom of the added section. The modified column was then operated so that cold water entered the top of the column, a cold 24%, by weight, aqueous $MnCl_2$ solution entered the column below the top scrubbing section and the HCN and $Cl_2$ entered at the same location used in the previous experiments.

Table III shows the results of a representative run carried out with the modified column.

TABLE III

| Feed (gm Min) | | | | Overhead Gases (%) | | | Reaction Zone Temp. (° C) | Effluent Liquid % HCl | % Hydrolysis | % $NCl_3$ |
|---|---|---|---|---|---|---|---|---|---|---|
| HCN | $Cl_2$ | $MnCl_2$ (24%) | $H_2O$ | HCN | $Cl_2$ | CNCl | | | | |
| 1.0 | 2.90 | 15.3 | 4.0 | Tr | 9.8 | 90.2 | 23 | 6.4 | 0 | ND |

Note that the use of the modified column shows further improvement in preventing both $NCl_3$ formation and HCN escape from the column.

EXAMPLE II

The following example presents a reaction scheme for reactions II, III and IV.

The cyanogen chloride reactor of Example I was operated so that the effluent leaving the reactor contained 7.5 parts of HCl dissolved in 80 parts of water along with 20 parts of $MnCl_2$. A small amount of free chlorine was also present in the effluent solution. The effluent flowed to a reaction zone which was also fed with a 100% excess of recycled $MnO_2$. The resultant slurry was then boiled at a temperature of 103° C, whereupon the HCl reacted with the $MnO_2$ to form water and chlorine in accordance with reaction II. For each 6 parts of HCl that reacted, 3.58 parts of $MnO_2$ was converted to 5.18 parts of $MnCl_2$. The chlorine formed in the reaction along with the dissolved chlorine contained in the effluent vaporized and the gaseous chlorine was returned to the CNCl reactor.

Approximately 80% of the HCl reacted quickly to form a concentrated $MnCl_2$ solution (approximately 25%, by weight). The reaction was conducted under sufficient pressure so that, as noted above, the evolved chlorine (2.92 parts for each 6 parts of HCl which reacted) could flow back to the CNCl reactor. At that point, the bulk of the solution (approximately 80%) was pumped through a heat exchanger where it was cooled to about 15° C and then was pumped into the CNCl reactor at a level between the two scrubbing zones. The quantity of $MnCl_2$ recycled to the CNCl reactor was equal to the quantity contained in the liquid effluent that left the reactor.

The remainder of the $MnCl_2$ solution was pumped to an evaporator in which sufficient water was evaporated to form a solution containing about 50% $MnCl_2$. The vapor was condensed, cooled and recycled to the top of the CNCl reactor.

The concentrated 50% $MnCl_2$ solution was then pumped to a second reaction zone in which it was contacted with 100% excess of solid $MnO_2$, and a threefold excess of nitric acid whose concentration was close to the azeotropic composition.

In this reaction zone, which was an elongated column fitted with a bottom reboiler, the slurry entered close to the top and the evolved chlorine left from the top for recycle to the CNCl reactor. By operating so that the aqueous phase boiled at the pressure required to enable the evolved chlorine to flow into the CNCl reactor, chlorine formation reaction III was necessarily carried out at a temperature in excess of 120° C the maximum boiling point of the $HNO_3$-$H_2O$ system at atmospheric pressure. At this elevated temperature, the speed of the reaction was quicker than at lower temperatures.

The water contained in the $MnCl_2$ solution fed to the reaction zone plus the water formed in the reaction diluted the nitric acid. By using an excess of concentrated nitric acid, this water has a minor effect on the acid concentration. Under these conditions, the desired reaction went rapidly and substantially to completion. For each 5.18 parts of $MnCl_2$ plus an accompanying 0.31 parts of HCl, it was seen that 3.94 parts of $MnO_2$ and 10.86 parts of $HNO_3$ reacted.

The mixture formed on completion of the reaction was composed of 28.53 parts water, 32.58 parts nitric acid containing 15.44 parts dissolved manganous nitrate with the excess 7.52 parts manganese dioxide suspended in the liquid. The bulk of the manganese dioxide was permitted to settle out and thereafter was recycled to the reaction zone for reaction III. The supernatant liquid substantially free from suspended $MnO_2$ was passed to a fractional distillation unit. Water was fractionally distilled out of the mixture to form a solution containing about 57% nitric acid in which the manganous nitrate was dissolved.

The solution was then pumped at a controlled rate into a fluidized bed of particles of manganese dioxide which were maintained above 200° C. by immersed electric heating elements. For this experiment, steam was utilized as the initial fluidizing medium. The gas leaving the top of the reactor was cooled by allowing it to flow through two condensers connected in series but separated by a gas-liquid separator. A second gas-liquid separator was connected to the outlet of the second condenser which, in turn, was vented to a scrubber. The first condenser was cooled with ordinary cooling water, while the second was cooled with ice water. Substantially all of the water vapor and nitric acid condensed in the first condenser and collected in the first gas-liquid separator. Liquid $NO_2$ and a small amount of dilute nitric acid condensed in the second condenser and flowed into the second gas-liquid separator. A small amount of brown-colored gas ($NO_2$) flowed into the scrubber.

The condensate was not processed further. However, it was noted that the amount of solids in the fluidized bed gradually increased. The experiment was ended before bed overflow occurred. The gases exiting from the fluidized bed did not contain any solids, thereby indicating a quantitative conversion of manganous nitrate.

Summarizing, it is seen that this invention provides an improved aqueous cyanogen chloride process wherein the hydrogen chloride by-product is readily convertible to chlorine and wherein, as a subsequent operation, manganous nitrate is thermally decomposed to manganese dioxide under improved conditions. Variations may be made in materials, proportions and procedures without departing from the scope of the invention as defined by the following claims.

What is claimed is:

1. In the process of preparing cyanogen chloride which comprises the steps of reacting hydrogen cyanide and chlorine in an aqueous medium to form said cyanogen chloride and dissolved hydrogen chloride, and recovering the cyanogen chloride, the improvement comprising conducting said reaction in the presence of an aqueous manganous chloride solution in an amount effective to minimize hydrolysis losses and to prevent the formation of nitrogen trichloride.

2. The process of claim 1, wherein said chlorine and said hydrogen cyanide are present in concentrations ranging from about stoichiometric proportions to about 1.10 moles of chlorine per mole of hydrogen cyanide.

3. The process of claim 1, wherein the concentration of manganous chloride in said aqueous solution ranges from about 15–30%, by weight.

4. A process for preparing cyanogen chloride and gaseous chlorine which comprises the steps of reacting hydrogen cyanide and chlorine in an aqueous manganous chloride solution to form cyanogen chloride and hydrogen chloride dissolved in said manganous chloride solution; recovering the cyanogen chloride; reacting, at elevated temperatures, said hydrogen chloride-manganous chloride solution with an amount of solid manganese dioxide exceeding the the 1:4 molar ratio of manganese dioxide to hydrogen chloride to form gaseous chlorine and a residual manganous chloride solution; recovering said gaseous chlorine; reacting said residual manganous chloride solution with solid manganese dioxide and concentrated nitric acid at elevated temperatures to form gaseous chlorine and an acidic manganous nitrate solution; the molar ratio of manganese dioxide to manganous chloride being in excess of 1:1 and the molar ratio of nitric acid to manganous chloride being in excess of 4:1; and recovering said gaseous chlorine.

5. The process of claim 4, wherein said gaseous chlorine produce is recycled for use in the initial cyanogen chloride process.

* * * * *